United States Patent
Park et al.

(10) Patent No.: US 9,494,076 B2
(45) Date of Patent: Nov. 15, 2016

(54) ENGINE SYSTEM
(71) Applicant: Hyundai Motor Company, Seoul (KR)
(72) Inventors: Jong Il Park, Seoul (KR); Joowon Lee, Gwangju-si (KR); Nahm Roh Joo, Yongin-si (KR); Yoon Joo Kim, Yongin-si (KR); Dong Hee Han, Seoul (KR); Il Joong Hwang, Yongin-si (KR); Hyun Jun Lim, Incheon (KR)
(73) Assignee: Hyundai Motor Company, Seoul (KR)
( * ) Notice: Subject to any disclaimer, the term of this patent is extended or adjusted under 35 U.S.C. 154(b) by 176 days.
(21) Appl. No.: 14/447,206
(22) Filed: Jul. 30, 2014
(65) Prior Publication Data
US 2015/0167592 A1 Jun. 18, 2015
(30) Foreign Application Priority Data Dec. 17, 2013 (KR) .................. 10-2013-0157590

(51) Int. Cl.
| *F02B 37/18* | (2006.01) |
| *F02D 41/00* | (2006.01) |
| *F01N 13/10* | (2010.01) |
| *F02B 67/10* | (2006.01) |
| *F01P 7/16* | (2006.01) |
| *F02B 37/16* | (2006.01) |
| *F01P 3/02* | (2006.01) |

(52) U.S. Cl.
CPC ........... *F02B 37/183* (2013.01); *F01N 13/105* (2013.01); *F01P 7/165* (2013.01); *F02B 67/10* (2013.01); *F02D 41/0007* (2013.01); *F01P 2003/027* (2013.01); *F01P 2060/04* (2013.01); *F01P 2060/08* (2013.01); *F01P 2060/12* (2013.01); *Y02T 10/144* (2013.01)

(58) Field of Classification Search
CPC .... F02B 37/183; F02B 33/446; F02B 33/36; F02B 33/38; F02B 23/00; F02B 29/04; F02D 41/0007; F02D 9/00

USPC .................. 123/564, 563, 559.1; 60/602
See application file for complete search history.

(56) References Cited

U.S. PATENT DOCUMENTS

| 8,001,779 B2 * | 8/2011 | Styles ................... F02M 26/07 60/280 |
| 2011/0155108 A1 * | 6/2011 | Russ ...................... F02B 37/18 123/564 |

FOREIGN PATENT DOCUMENTS

| JP | 2006-249945 A | 9/2006 |
| JP | 2008-267257 A | 11/2008 |
| JP | 2012-7545 A | 1/2012 |
| JP | 4947007 B2 | 3/2012 |
| KR | 10-1145629 B1 | 5/2012 |

* cited by examiner

*Primary Examiner* — Mahmoud Gimie
(74) *Attorney, Agent, or Firm* — Morgan, Lewis & Bockius LLP

(57) ABSTRACT

An engine system may include a first intake line configured to supply external air to an intake manifold mounted in a cylinder block of an engine, an intake bypass valve disposed on the first intake line, a second intake line configured to bypass the intake bypass valve, a first exhaust line, through which exhaust gas discharged from an exhaust manifold mounted in the cylinder block flows, an exhaust bypass valve disposed on the first exhaust line, a second exhaust line configured to bypass the exhaust bypass valve, a turbo charger operated by exhaust gas passing through the second exhaust line, and configured to pump intake air flowing in the second intake line, a controller configured to control the intake bypass valve and the exhaust bypass valve, and a turbine housing configured to surround a turbine of the turbo charger. The turbine housing may be made of a material the same as that of a cylinder head of the engine.

15 Claims, 5 Drawing Sheets

ENGINE SYSTEM

CROSS-REFERENCE TO RELATED APPLICATION

The present application claims priority of Korean Patent Application Number 10-2013-0157590 filed on Dec. 17, 2013, the entire contents of which application are incorporated herein for all purposes by this reference.

BACKGROUND OF INVENTION

1. Field of Invention

The present invention relates to an engine system, and more particularly, to an engine system with maximized functions at low and middle speeds.

2. Description of Related Art

In general, it is known that a diesel engine has lower fuel consumption and higher efficiency than those of a gasoline engine. The diesel engine generally has efficiency of about 40%, which accords with a high compression ratio of the diesel engine.

Recently, in order to obtain higher output in the engine, a turbo charger, an intercooler, and the like are additionally included.

The engine adopting the turbo charger sucks and compresses exhaust gas or external air by using a compressor of the turbo charger, and in this case, the generated supercharged air (high temperature compressed air) is supplied to an engine.

However, the rapidly compressed air absorbs heat of the turbo charger and heat generated during the compression process, so that a density thereof is decreased, thereby degrading charging efficiency within a combustion chamber of the engine. Accordingly, it is possible to secure high density by cooling the supercharged air by using the intercooler, and as a result, the larger amount of air enters the combustion chamber of the engine, thereby obtaining a high output.

In the meantime, research on a decrease in fuel consumption and improvement of output torque in low and middle speed sections in respect to revolutions per minute of an engine in the engine including the turbo charger has been conducted, along with research on a more efficient control of supply of recirculated gas.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide an engine system for decreasing fuel consumption and improving output torque in low and middle speed sections, in which revolutions per minute of an engine are predetermined, in the engine including a turbo charger.

Further, the present invention has been made in an effort to provide an engine system, in which a turbine housing of a turbo charger is integrated with a cylinder head or is made of the same material as that of the cylinder head.

Various aspects of the present invention provide an engine system, including: a first intake line configured to supply external air to an intake manifold mounted in a cylinder block of an engine; an intake bypass valve disposed on the first intake line; a second intake line configured to bypass the intake bypass valve; a first exhaust line, through which exhaust gas discharged from an exhaust manifold mounted in the cylinder block flows; an exhaust bypass valve disposed on the first exhaust line; a second exhaust line configured to bypass the exhaust bypass valve; a turbo charger operated by exhaust gas passing through the second exhaust line, and configured to pump intake air flowing in the second intake line; a controller configured to control the intake bypass valve and the exhaust bypass valve; and a turbine housing configured to surround a turbine of the turbo charger, wherein the turbine housing is made of a material the same as that of a cylinder head of the engine.

The engine system may further include an intercooler installed in the second intake line at a downstream side of a compressor of the turbo charger. The engine system may further include a throttle body configured to control an intake flow rate supplied to the intake manifold.

The controller may open the intake bypass valve and the exhaust bypass valve when a load is lower than a predetermined load value in a section in which revolutions per minute (RPM) of the engine are lower than a predetermined RPM value, and the controller may control an output by controlling an opening rate of the exhaust bypass valve.

The controller may close the intake bypass valve and open the exhaust bypass valve when a load is higher than a predetermined load value in a section in which revolutions per minute of the engine are lower than a predetermined RPM value, and the controller may control an output by controlling an opening rate of the exhaust bypass valve.

The controller may open the intake bypass valve and the exhaust bypass valve in a section in which revolutions per minute of the engine are higher than a predetermined RPM value, and the controller may control an output by controlling an opening rate of the exhaust bypass valve.

The second intake line may be branched from an air cleaner box, and may be joined to the first intake line by sequentially passing through a compressor of the turbo charger and an intercooler. The second exhaust line may be branched from the exhaust manifold, and may be joined to the first exhaust line by passing through a turbine of the turbo charger.

A capacity of the turbo charger may be set to have a minimum value capable of obtaining a maximum output torque at a predetermined low-speed region of the engine adopting a natural aspiration method.

The turbine housing may be integrally or monolithically formed with the cylinder head. The turbine housing may be cooled by a coolant supplied to the cylinder head. The coolant cooling the turbine housing may be supplied to the cylinder head again.

The turbine housing may be cooled by a coolant directly supplied from a water pump.

The turbine housing may be cooled by a coolant supplied to the turbo charger. A path of the coolant supplied to the turbo charger may pass through the turbine housing.

The turbine housing may be made of an aluminum material.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
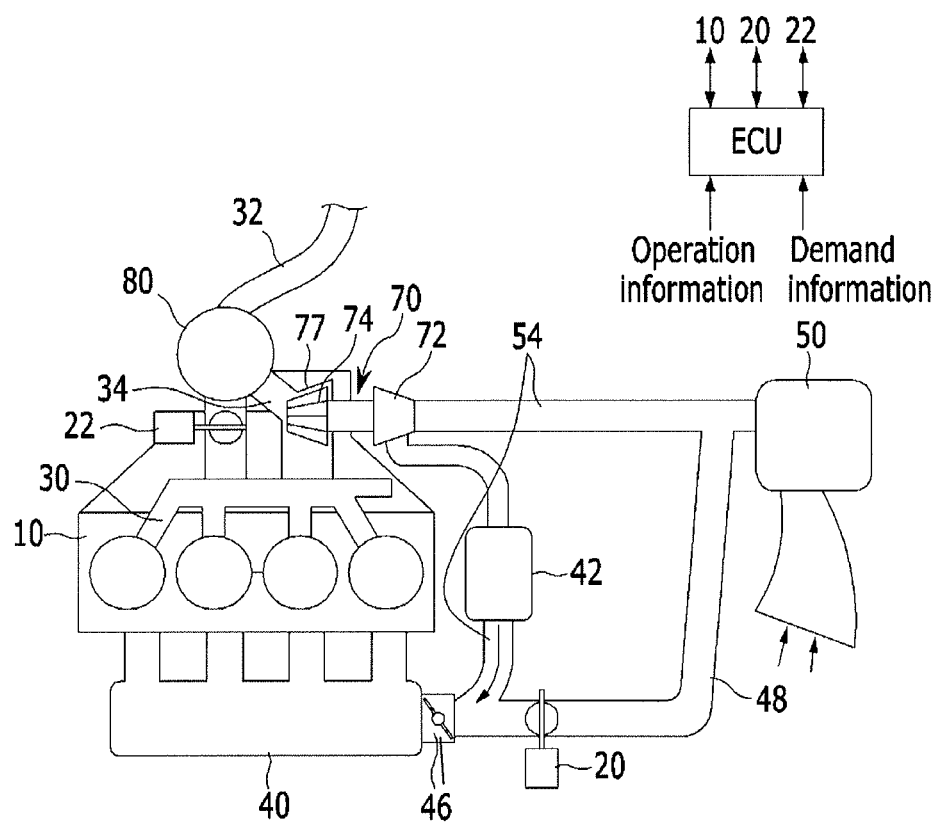
FIG. 1 is a configuration diagram schematically illustrating an exemplary engine system according to the present invention.

FIG. 1 is a configuration diagram schematically illustrating an engine system according to various embodiments of the present invention. As illustrated in FIG. 1, an engine system according to various embodiments of the present invention includes an air cleaner box 50, a first intake line 48, a second intake line 54, a throttle body 46, an intake manifold 40, an engine 10, an exhaust manifold 30, a first exhaust line 32, an exhaust bypass valve 22, a catalyst 80, an intercooler 42, a second exhaust line 34, a turbo charger 70, and an electronic control unit ECU.

The first intake line 48 and the second intake line 54 are joined so as to supply intake air to the engine 10.

The second intake line 54 bypasses the intake bypass valve 20, and is branched from the air cleaner box 50, and joined to the first intake line 48 via a compressor 72 of the turbo charger 70 and the intercooler 42.

The throttle body 46 is disposed at a point at which the first intake line 48 and the second intake line 54 are joined. In some embodiments, the second intake line 54 is not branched from the air cleaner box 50, but may be branched from the first intake line 48.

The first exhaust line 32 is branched from the exhaust manifold 30, and the exhaust bypass valve 22 and the catalyst 80 are sequentially disposed in the first exhaust line 32.

The second exhaust line 34 bypasses the exhaust bypass valve 22, and the second exhaust line 34 is branched from the exhaust manifold 30 to be joined to the first exhaust line 32 between the exhaust bypass valve 22 and the catalyst 80. In some embodiments, the second exhaust line 34 is not branched from the exhaust manifold 30, but may be branched from the first exhaust line 32.

In various embodiments of the present invention, in a state where the ECU closes the intake bypass valve 20, the intake air is supplied from the second intake line 54 to the intake manifold 40 through the compressor 72 of the turbo charger and the intercooler 42.

Further, in a state where the ECU opens the intake bypass valve 20, the intake air is supplied to the combustion chamber of the engine 10 through the first intake line 48 and the throttle body 46.

When the ECU completely opens the exhaust bypass valve 22, the exhaust gas is discharged to the outside through the catalyst of the first exhaust line 32, and when the ECU closes the exhaust bypass valve 22, the exhaust gas operates the turbine 74 of the turbo charger 70 through the second exhaust line 34, and is discharged to the outside through the catalyst 80.

The ECU may adjust an opening rate of the exhaust bypass valve 22 to control an operation of the turbo charger 70, detect an operation condition of the engine 10 and a demanded condition of a driver for an acceleration sensor, a brake sensor, and the like to calculate demanded torque, and control the intake bypass valve 20, the exhaust bypass valve 22, and an injector of the engine 10 to inject fuel.

In various embodiments of the present invention, in the gasoline engine 10 adopting the natural aspiration method in the related art, air may be additionally supplied by using the turbo charger 70 in a low speed section having a predetermined value or lower to improve torque at a low speed, and performance of the natural aspiration method may be maintained without an assistance of the turbo charger 70 in a high speed section having a predetermined value or higher.

Further, a capacity of the turbo charger 70 is characterized in that an air flow rate is 2 or smaller based on an air flow coefficient passing through the compressor, and here, the air flow coefficient is a maximum air flow rate passing through the compressor/a displacement.

In addition, supercharging by the turbo charger 70 may be performed only at predetermined revolutions per minute of the engine 10, at which maximum torque is generated in the engine 10 adopting the natural aspiration method. Accordingly, the intake bypass valve 20 and the exhaust bypass valve 22 may be completely opened at the predetermined revolutions per minute or more of the engine 10 to exhibit the similar or identical performance to that of the engine adopting the natural aspiration method.

The engine system according to various embodiments of the present invention further includes a turbine housing 74. The turbine housing 74 is a case of the turbine 74, inside which the turbine 74 of the turbo charger 70 is disposed. Further, the turbine housing 74 may be made of the same material as that of the cylinder head 12. In addition, the turbine housing 74 may be made of an aluminum material. In various embodiments of the present invention, the turbine housing 74 is not exposed to an excessively high temperature.

Figure 2:
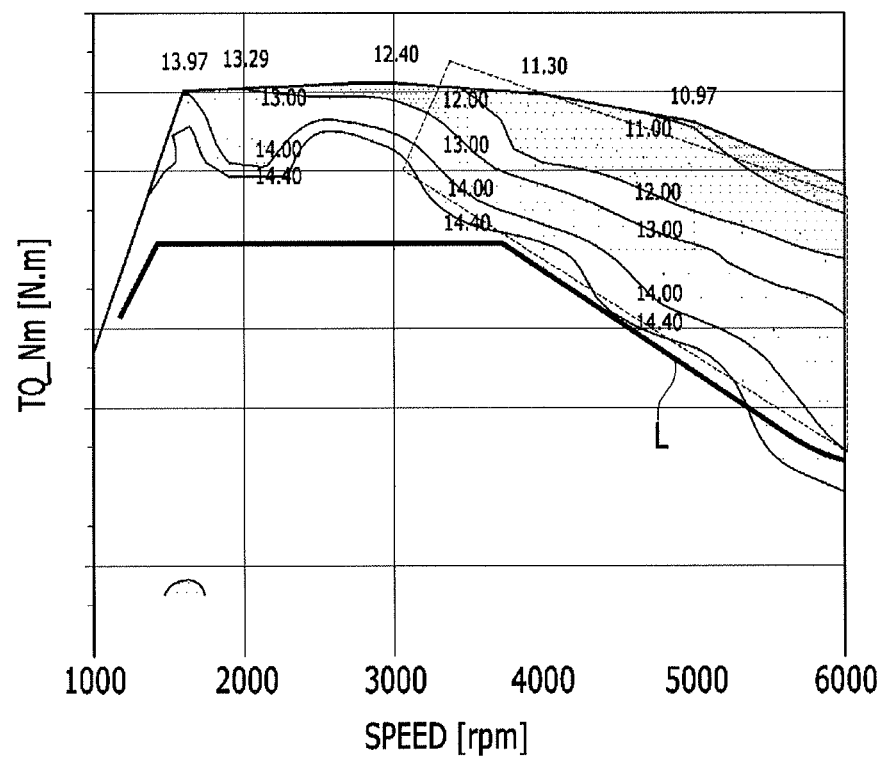
FIG. 2 is a graph illustrating a relationship between revolutions per minute and an output of an exemplary engine according to the present invention.

FIG. 2 is a graph illustrating a relationship between revolutions per minute and an output of the engine according to various embodiments of the present invention. As illustrated in FIG. 2, a horizontal axis indicates revolutions per minute of the engine 10, and a vertical axis indicates an output of the engine 10. Further, a bold solid line L at a lower side represents a relationship of an output according to revolutions per minute of the engine 10. As can be seen by the bold solid line L of the graph, the engine 10 is operated in a region at which an exhaust temperature is relatively low.

Figure 3:
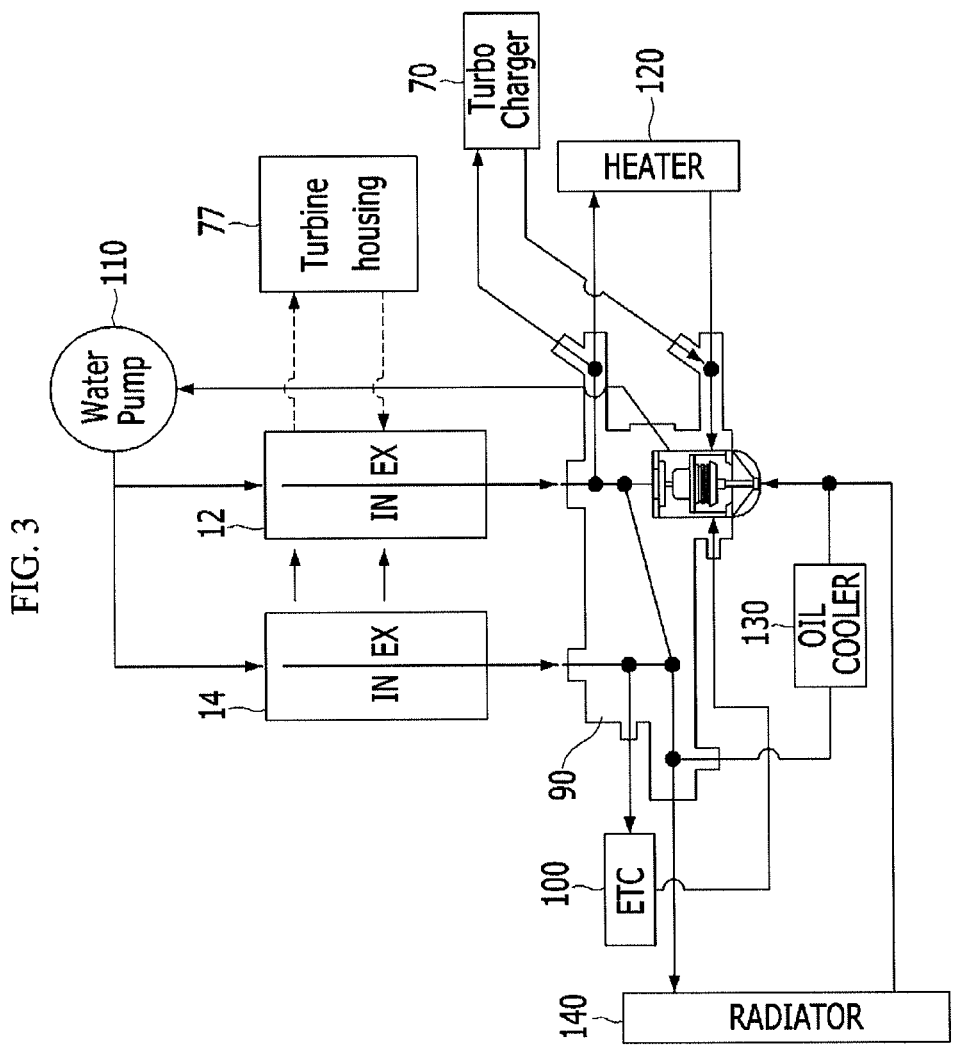
FIG. 3 is a block diagram illustrating a coolant path of a turbine housing shared with a cylinder head in an exemplary engine system according to the present invention.
Figure 4:
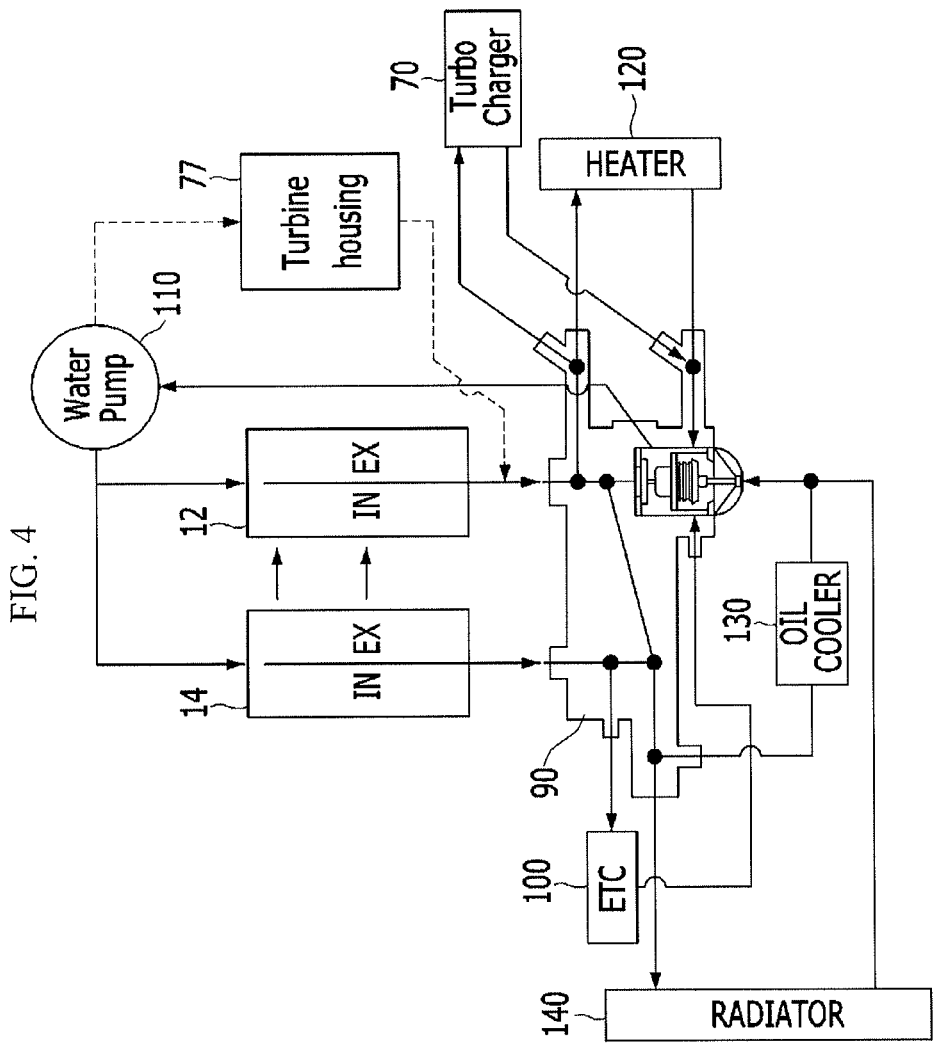
FIG. 4 is a block diagram illustrating a coolant path of an independently formed turbine housing in an exemplary engine system according to the present invention.
Figure 5:
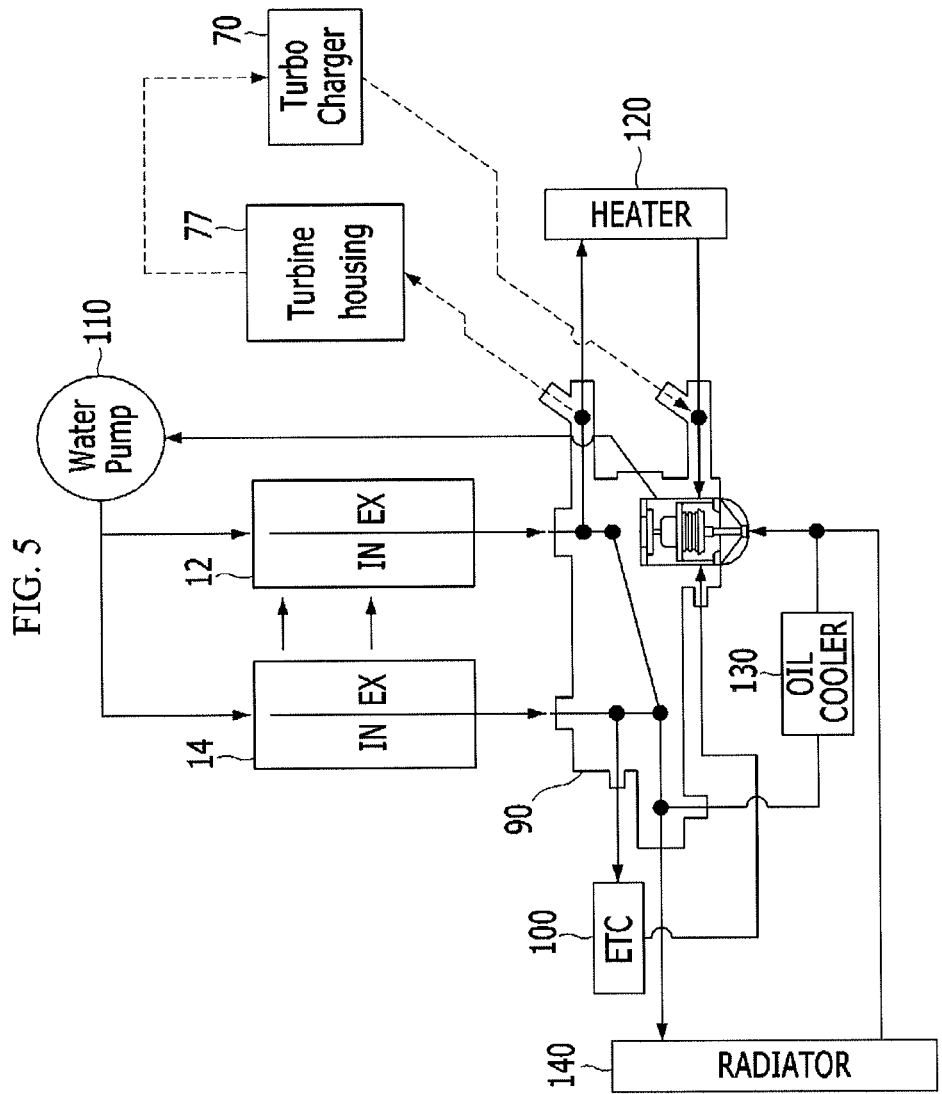
FIG. 5 is a block diagram illustrating a coolant path of a turbine housing using coolant of a turbo charger in an exemplary engine system according to the present invention.

FIG. 3 is a block diagram illustrating a coolant path of a turbine housing shared with a cylinder head, FIG. 4 is a block diagram illustrating a coolant path of an independently formed turbine housing, and FIG. 5 is a block diagram illustrating a coolant path of a turbine housing using coolant of a turbo charger.

As illustrated in FIGS. 3 to 5, the turbine housing 77 is disposed in a path of coolant, which is supplied from a coolant tank 90 by pumping of a water pump 110 and passes through a cylinder head 12, a cylinder block 14, an electronic traction control (ETC) system 100, a heater 120, an oil cooler 130, a radiator 140, and a turbo charger 70. In FIGS. 3 to 5, the path of the coolant passing through the turbine housing 77 is indicated by a dotted-line arrow.

Referring to FIG. 3, the turbine housing 77 may share the coolant with the cylinder head 12. That is, the turbine housing 77 may be integrally or monolithically formed with the cylinder head 12 to be cooled by the coolant supplied to the cylinder head 12, or cooled by receiving the coolant from the cylinder head 12. Further, the coolant cooling the turbine housing 77 may be supplied to the cylinder head 12 again.

Referring to FIG. 4, the turbine housing 77 may directly receive the coolant from the water pump 110, and may be cooled by the path of the coolant formed so that the coolant passing through the turbine housing 77 is combined with the coolant passing through the cylinder head 12.

Referring to FIG. 5, the turbine housing 77 surrounding the turbine 74 of the turbo charger 70 may be cooled by using the coolant supplied to the turbo charger 70. That is, the coolant supplied to a center housing of the turbo charger 70 may be supplied to the center housing of the turbo charger 70 by passing through the turbine housing 77.

As described above, according to the exemplary embodiment of the present invention, it is possible to improve fuel efficiency by increasing torque in a low speed region of the engine 10. Further, it is possible to decrease a capacity of the turbo charger 70, and increase low-speed torque by using the turbo charger 70 only at a low-speed region of the engine 10, thereby decreasing fuel consumption. In addition, an operation region by supercharging may be minimized, so that the turbine housing 77 may be made of a material having low heat resistance. Accordingly, the turbine housing 77 may be integrated with the cylinder head 12 or may be made of the same material as that of the cylinder head 12, and cost of the turbine housing 77 may be decreased.

For convenience in explanation and accurate definition in the appended claims, the terms "upstream" or "downstream", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine system, comprising:
a first intake line connected to an intake manifold and configured to supply external air to the intake manifold mounted in a cylinder block of an engine;
an intake bypass valve disposed on the first intake line;
a second intake line configured to bypass the intake bypass valve;
a first exhaust line connected to the exhaust manifold, wherein through the first exhaust line exhaust gas discharged from the exhaust manifold mounted in the cylinder block flows;
an exhaust bypass valve disposed on the first exhaust line;
a second exhaust line connected to the exhaust manifold and configured to bypass the exhaust bypass valve;
a turbo charger disposed on the second exhaust line, operated by exhaust gas passing through the second exhaust line, and configured to pump intake air flowing in the second intake line;
a controller configured to control the intake bypass valve and the exhaust bypass valve; and
a turbine housing configured to surround a turbine of the turbo charger,
wherein the turbine housing is made of a material the same as that of a cylinder head of the engine, and
wherein the turbine housing is integrally or monolithically formed with the cylinder head.

2. The engine system of claim 1, further comprising:
an intercooler installed in the second intake line at a downstream side of a compressor of the turbo charger.

3. The engine system of claim 1, further comprising:
a throttle body configured to control an intake flow rate supplied to the intake manifold.

4. The engine system of claim 1, wherein:
the controller opens the intake bypass valve and the exhaust bypass valve when a load is lower than a predetermined load value in a section in which revolutions per minute (RPM) of the engine are lower than a predetermined RPM value, and
the controller controls an output by controlling an opening rate of the exhaust bypass valve.

5. The engine system of claim 1, wherein:
the controller closes the intake bypass valve and opens the exhaust bypass valve when a load is higher than a predetermined load value in a section in which revolutions per minute of the engine are lower than a predetermined RPM value, and
the controller controls an output by controlling an opening rate of the exhaust bypass valve.

6. The engine system of claim 1, wherein:
the controller opens the intake bypass valve and the exhaust bypass valve in a section in which revolutions per minute of the engine are higher than a predetermined RPM value, and
the controller controls an output by controlling an opening rate of the exhaust bypass valve.

7. The engine system of claim 1, wherein:
the second intake line is branched from an air cleaner box, and is joined to the first intake line by sequentially passing through a compressor of the turbo charger and an intercooler.

8. The engine system of claim 1, wherein:
the second exhaust line is branched from the exhaust manifold, and is joined to the first exhaust line by passing through a turbine of the turbo charger.

9. The engine system of claim 1, wherein:
a capacity of the turbo charger is set to have a minimum value capable of obtaining a maximum output torque at a predetermined low-speed region of the engine adopting a natural aspiration method.

10. The engine system of claim 1, wherein:
the turbine housing is cooled by a coolant supplied to the cylinder head.

11. The engine system of claim 10, wherein:
the coolant cooling the turbine housing is supplied to the cylinder head again.

12. The engine system of claim 1, wherein:
the turbine housing is cooled by a coolant directly supplied from a water pump.

13. The engine system of claim 1, wherein:
the turbine housing is cooled by a coolant supplied to the turbo charger.

14. The engine system of claim 13, wherein:
a path of the coolant supplied to the turbo charger passes through the turbine housing.

15. The engine system of claim 1, wherein:
the turbine housing is made of an aluminum material.

* * * * *